United States Patent
Randhi et al.

(10) Patent No.: US 12,443,623 B2
(45) Date of Patent: Oct. 14, 2025

(54) SYSTEMS AND METHODS FOR ASYNCHRONOUS DATA MIGRATION

(71) Applicant: BANK OF AMERICA CORPORATION, Charlotte, NC (US)

(72) Inventors: Venugopala Rao Randhi, Telangana (IN); Jyothi Gaddam, Telangana (IN); Mohan Varma Kalidindi, Telangana (IN); Rama Venkata S. Kavali, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/593,105

(22) Filed: Mar. 1, 2024

(65) Prior Publication Data
US 2025/0278411 A1  Sep. 4, 2025

(51) Int. Cl.
*G06F 16/27* (2019.01)
*G06F 16/21* (2019.01)

(52) U.S. Cl.
CPC .......... *G06F 16/273* (2019.01); *G06F 16/214* (2019.01); *G06F 16/219* (2019.01)

(58) Field of Classification Search
USPC ........................................................ 707/613
See application file for complete search history.

(56) References Cited

U.S. PATENT DOCUMENTS

| | | | |
|---|---|---|---|
| 10,649,953 B2 | 5/2020 | Yang | |
| 10,678,450 B2 | 6/2020 | Grube | |
| 10,754,822 B1 * | 8/2020 | Patil | G06F 16/119 |
| 10,877,683 B2 | 12/2020 | Wu | |
| 10,979,875 B2 | 4/2021 | Dai | |
| 11,010,358 B2 | 5/2021 | Kong | |
| 11,057,356 B2 | 7/2021 | Malhotra | |
| 11,068,187 B2 | 7/2021 | Erofeev | |
| 11,126,358 B2 | 9/2021 | Kumar | |
| 11,132,139 B2 | 9/2021 | Kavuri | |
| 11,237,919 B2 | 2/2022 | Pradhan | |
| 11,243,922 B2 | 2/2022 | Xu | |
| 11,256,665 B2 | 2/2022 | Prahlad | |
| 11,316,920 B2 | 4/2022 | Klose | |
| 11,366,723 B2 | 6/2022 | Bansod | |
| 11,372,710 B2 | 6/2022 | Coronado | |
| 11,481,144 B1 | 10/2022 | Chen | |
| 11,983,075 B2 | 5/2024 | Bhagi | |
| 2021/0117246 A1 | 4/2021 | Lal | |
| 2021/0279217 A1 | 9/2021 | Senthilnathan | |
| 2021/0373770 A1 * | 12/2021 | Nandan | G06F 3/067 |
| 2022/0147490 A1 * | 5/2022 | Shivani | G06F 16/1844 |
| 2022/0414071 A1 * | 12/2022 | Grimes | H04L 67/535 |
| 2023/0418584 A1 * | 12/2023 | Huang | G06F 11/0706 |
| 2024/0205082 A1 | 6/2024 | Kumarasamy | |

* cited by examiner

*Primary Examiner* — Tony Mahmoudi
(74) *Attorney, Agent, or Firm* — Moore & Van Allen PLLC; Lauren M. Stokes

(57) ABSTRACT

Systems, computer program products, and methods are described herein for asynchronous data migration. The present invention is configured to identify a source file data based on an update trigger for the source file data; identify, using an artificial intelligence (AI) engine, a source file type for the source file data; determine a dataset range for the source file data to ingest to a target data file, wherein the dataset range comprises a portion of data of the source file data; and ingest the dataset range to the target data file.

14 Claims, 12 Drawing Sheets

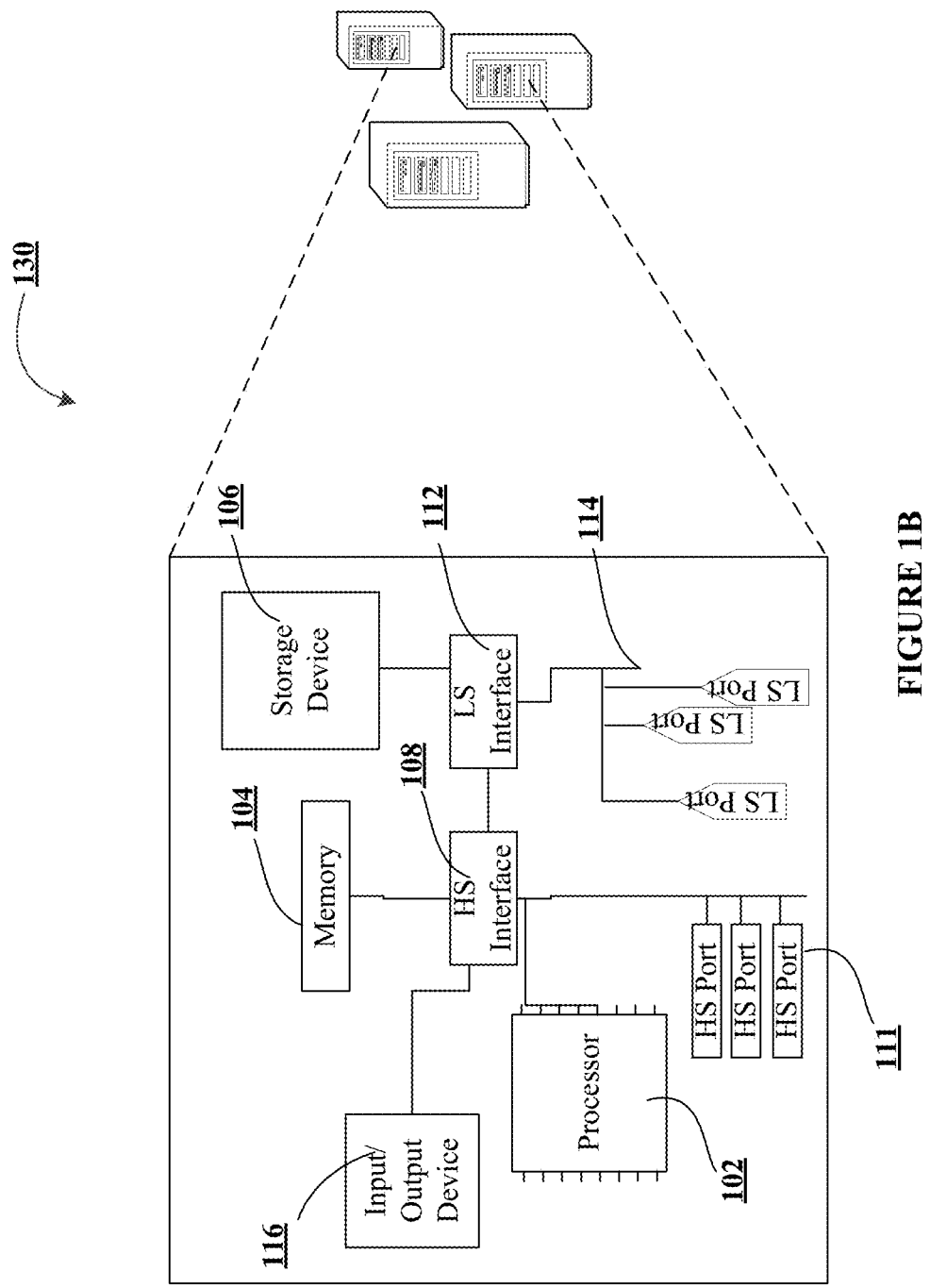

One-to-Multiple Type

800

Aggregate, source provides in sets

| Unique Identifier (e.g., Account Identifier) | Date | Dependency Data (e.g., amount) | |
|---|---|---|---|
| 1000011 | 20231024 | 10 | |
| 1000013 | 20231024 | -50 | |
| 1000013 | 20231024 | -50 | CL - 2 |
| 1000012 | 20231024 | 1000000 | CL – 1: BaseLine |
| 1000014 | 20231024 | In Progress (e.g., still writing) | CL |

FIGURE 8A

Dependency Data (e.g., Aggregated Amount Balances)

850

| Unique Identifier (e.g., Account Identifier) | Date | Total Dependency/Aggregate Dependency Data |
|---|---|---|
| 1000011 | 20231024 | 10 |
| 1000013 | 20231024 | -100 |
| 1000012 | 20231024 | 1000000 |

FIGURE 8B

Reasonableness Check in Real-Time

875

| Unique Identifier (e.g., Account Identifier) | Reasonableness Check |
|---|---|
| 1000012 | Amount outside of Reasonableness Threshold |

FIGURE 8C

One-to-Multiple Type

900

| Unique Identifier (e.g., Account Identifier) | Aggregate, source provides in sets | | |
|---|---|---|---|
| | Date | Dependency Data (e.g., amount) | |
| 1000011 | 20231024 | 10 | |
| 1000013 | 20231024 | -50 | |
| 1000013 | 20231024 | -50 | |
| 1000012 | 20231024 | 1000000 | PL |
| 1000006 | 20231024 | 1000 | |
| 1000006 | 20231024 | 20 | |
| 1000100 | 20231024 | 5000 | |
| 1000014 | 20231024 | -50 | |
| 1000014 | 20231024 | 20 | |
| 1000014 | 20231024 | 20 | |
| 1000014 | 20231024 | 20 | |
| 1000014 | 20231024 | 20 | |
| 1000015 | 20231024 | 200 | CL - 3 |
| 1000015 | 20231024 | 100 | CL - 2 |
| 1000015 | 20231024 | In Progress | CL - 1 Baseline / CL |

FIGURE 9A

Dependency Data (e.g., Aggregated Amount Balances)

950

| Unique Identifier (e.g., Account Identifier) | Date | Total Dependency/Aggregate Dependency Data |
|---|---|---|
| 1000011 | 20231024 | 10 |
| 1000013 | 20231024 | -100 |
| 1000012 | 20231024 | 1000000 |
| 1000006 | 20231024 | 980 |
| 1000100 | 20231024 | 5000 |
| 1000014 | 20231024 | 30 |

FIGURE 9B

Reasonableness Check in Real-Time

975

| Unique Identifier (e.g., Account Identifier) | Reasonableness Check |
|---|---|
| 1000012 | Amount outside of Reasonableness Threshold |
| 1000014 | Instance Transaction outside of Reasonableness Threshold |

FIGURE 9C

SYSTEMS AND METHODS FOR ASYNCHRONOUS DATA MIGRATION

FIELD OF THE INVENTION

The present invention embraces a system for asynchronous data migration.

BACKGROUND

Issues often arise between systems and their datasets when data is supposed to be transferred, copied, and/or migrated to a downstream system or database. This is especially true when data in the system is still being actively written and read before it can be migrated downstream. Such migration can take a lot of time, can lead to a lot of errors (especially when data is being migrated as a whole set and data may go missing during the migration), and can be completely lost if the system goes down and its data is lost. Thus, there exists a need for a system, method, or computer program product that can efficient, accurately, and dynamically migrate data from a source file to a target file in an asynchronous fashion.

Applicant has identified a number of deficiencies and problems associated with data migration. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for asynchronous data migration is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify an source file data based on an update trigger for the source file data; identify, using an artificial intelligence (AI) engine, a source file type for the source file data; determine, using a dataset finder, a dataset range for the source file data to ingest to a target data file, wherein the dataset range comprises a portion of data of the source file data; and ingest the dataset range to the target data file.

In some embodiments, the update trigger is based on a file write input to the source file data.

In some embodiments, the update trigger comprises at least one of a real-time identification of a write input to the source file data or a real-time meeting of a wait threshold time.

In some embodiments, executing the computer-readable code is configured to cause the at least one processing device to: identify whether a security protocol is present for the source file data, wherein, in an instance where at least one security protocol is present, identify at least one cryptographic key for the at least one security protocol, or wherein, in an instance where at least one security protocol is not present, determine the dataset range for the source file data.

In some embodiments, the source file type comprises a one-to-one type for the source file data or a one-to-multiple type for the source file data.

In some embodiments, executing the computer-readable code is configured to cause the at least one processing device to: determine, using the AI engine, whether a critical dependency for the source file data is present, whether the source file data comprises priority, or whether abnormal data is present for the source file data; and determine, using the AI engine, a processing plan for the source file data.

In some embodiments, the dataset range comprises a backward copy of the source file data based on a latest line copy of the source file data, and a forward copy of the source file data based on a previously copied line. In some embodiments, the dataset range is looped until an end of the source file data. In some embodiments, the dataset range is based on a one-to-multiple type, and wherein the dataset range comprises the backward copy of the source file comprising a same unique identifier for the one-to-multiple type.

In some embodiments, an output of the source file data is aggregated to generate a dependency data for each unique identifier of the source file data.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
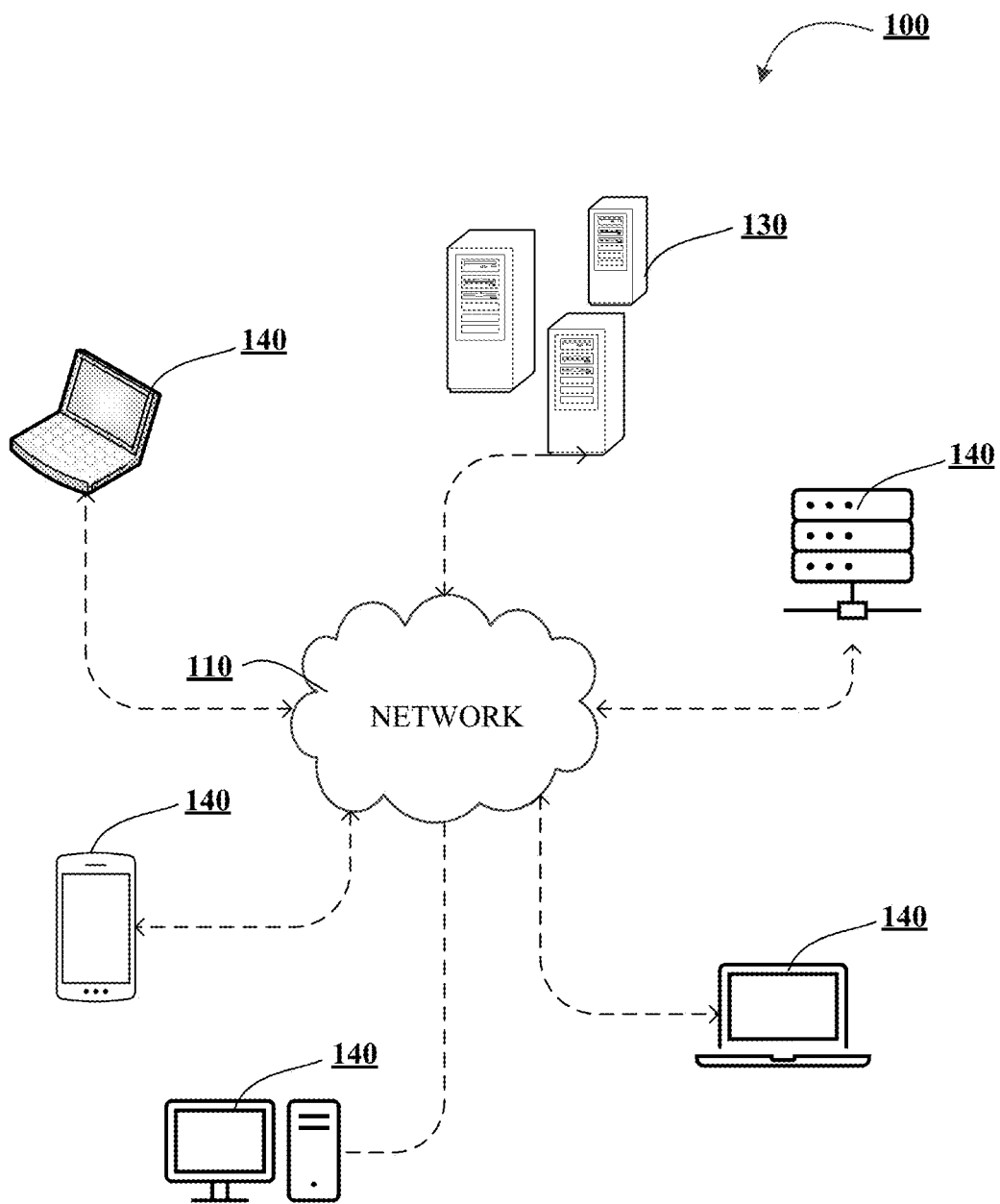
Figure 1C:
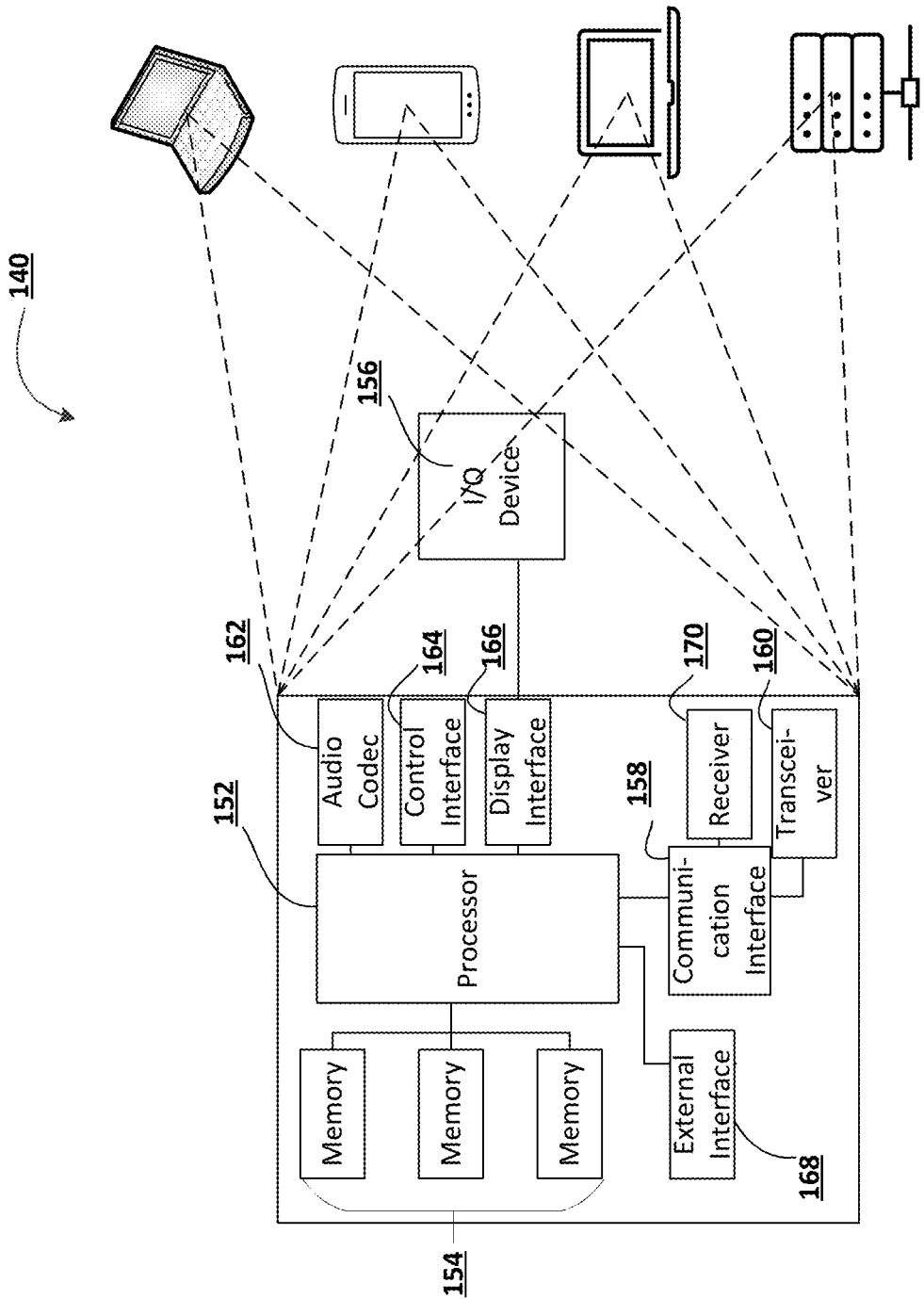
Figure 2:
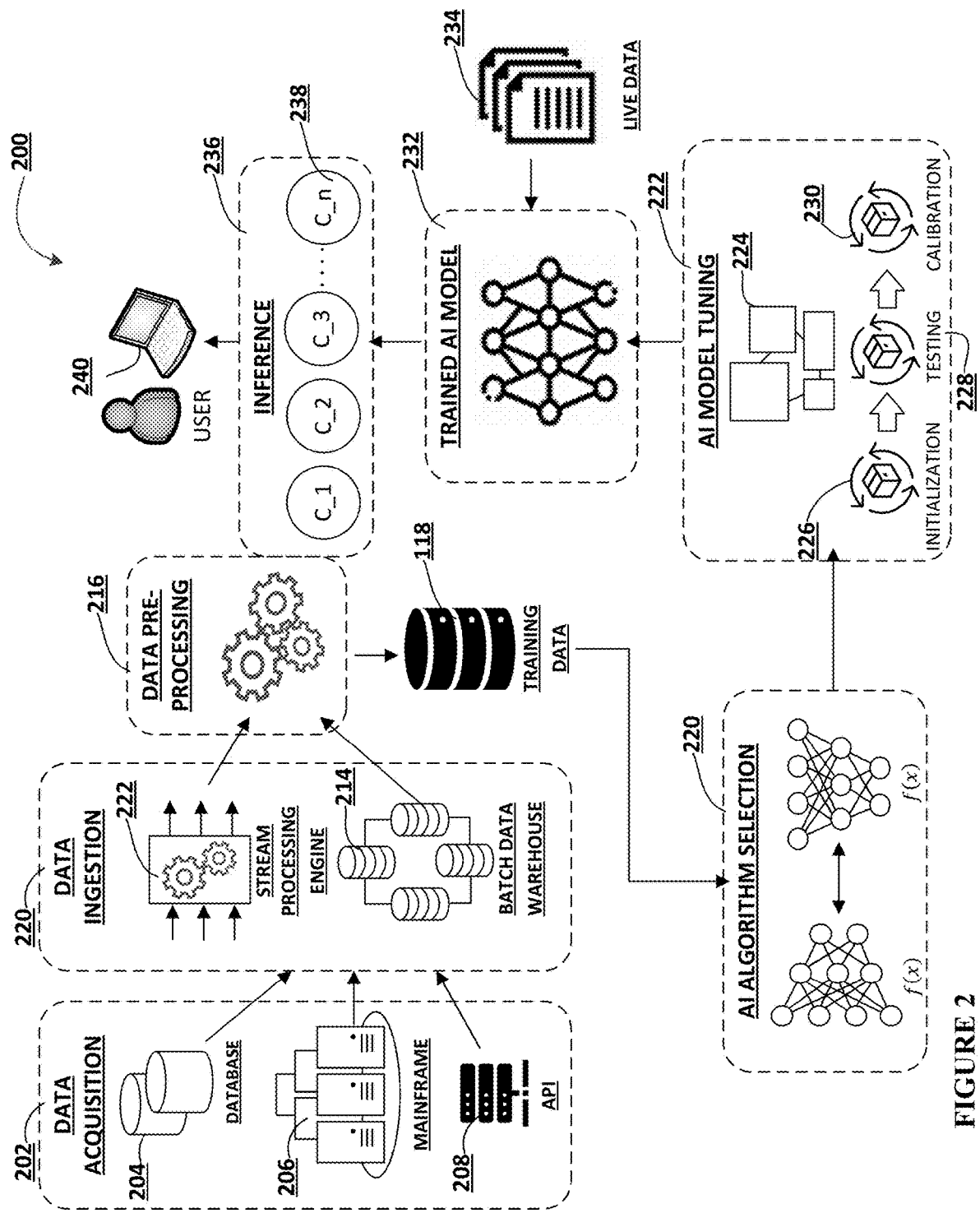
Figure 3:
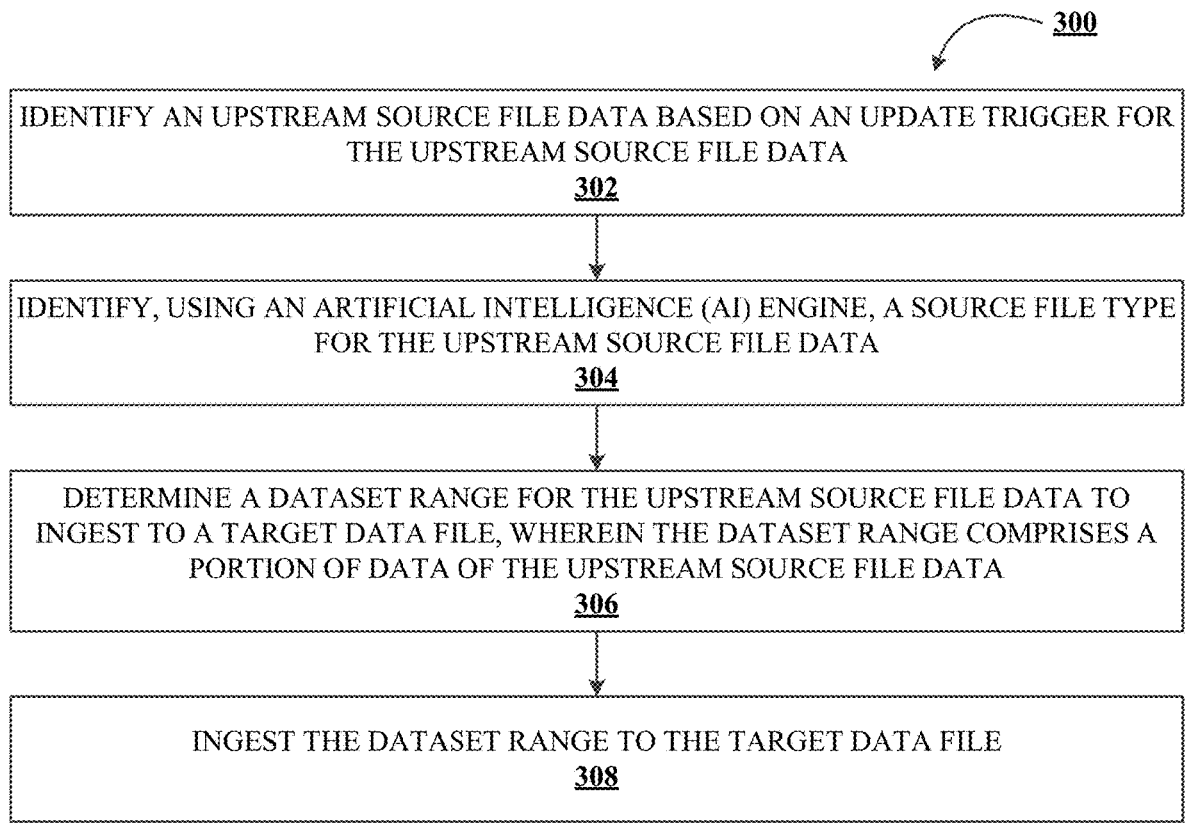
Figure 4:
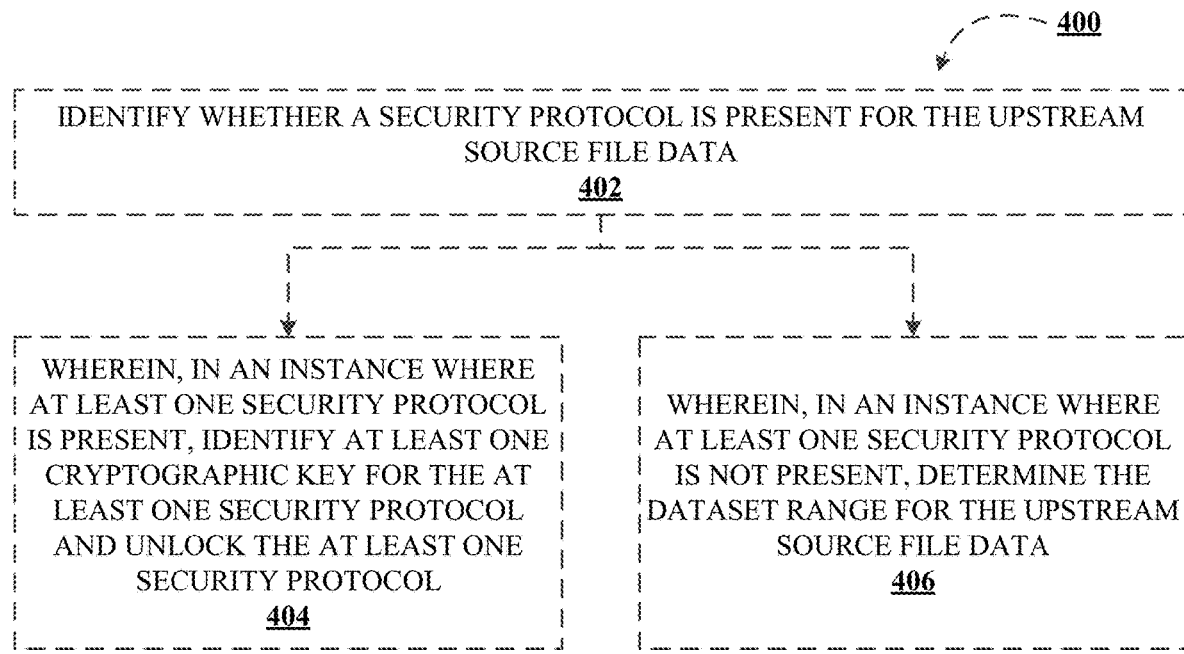
Figure 5:
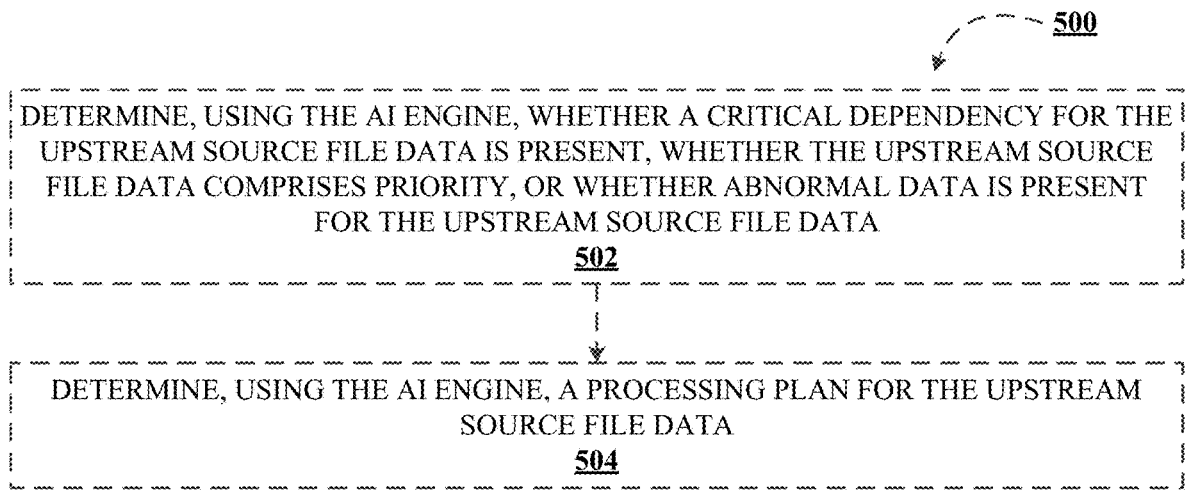
Figure 6:
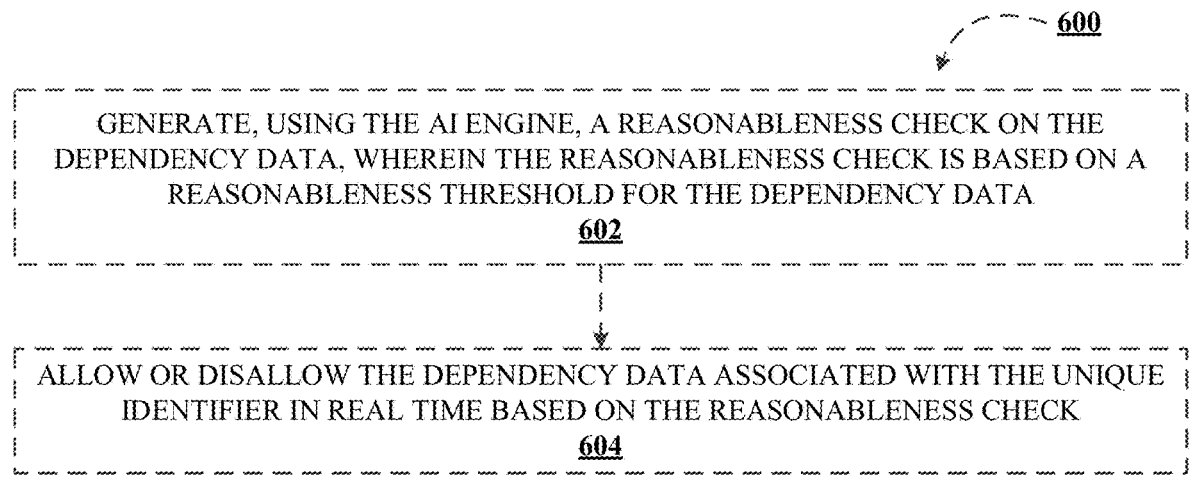
Figures 7A, 7B:
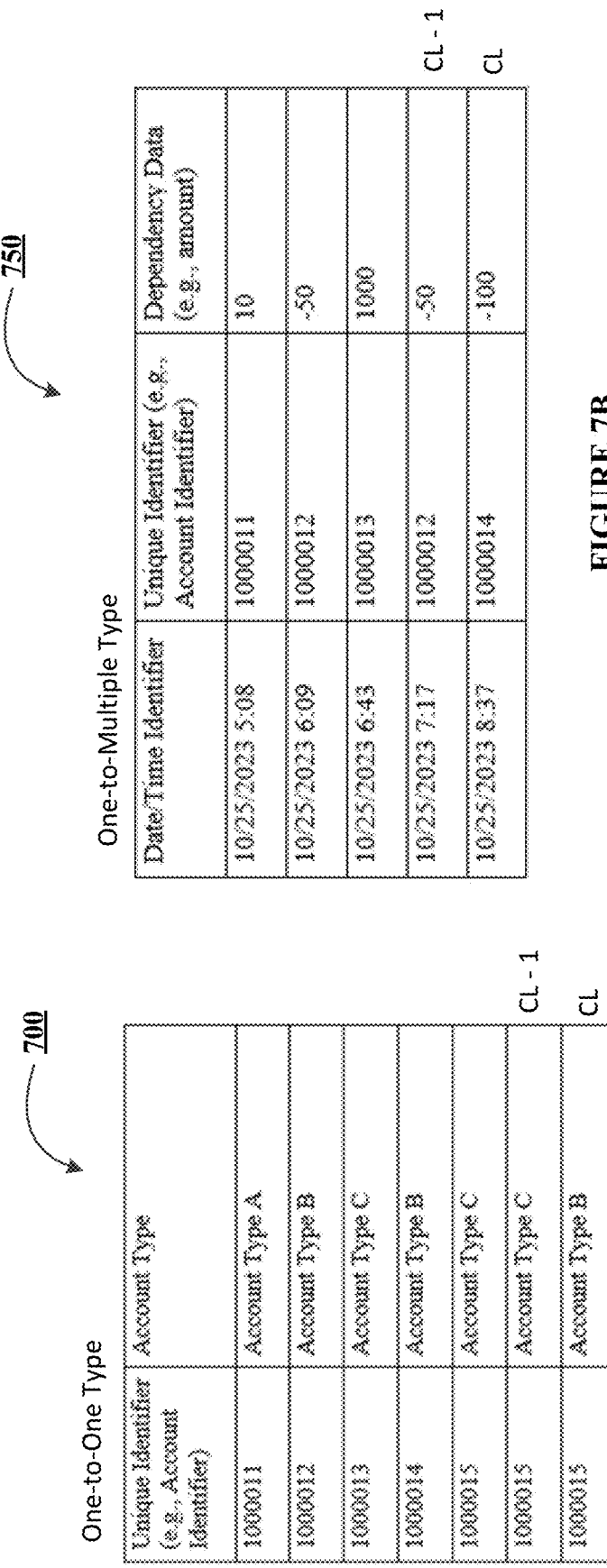
Figure 10:
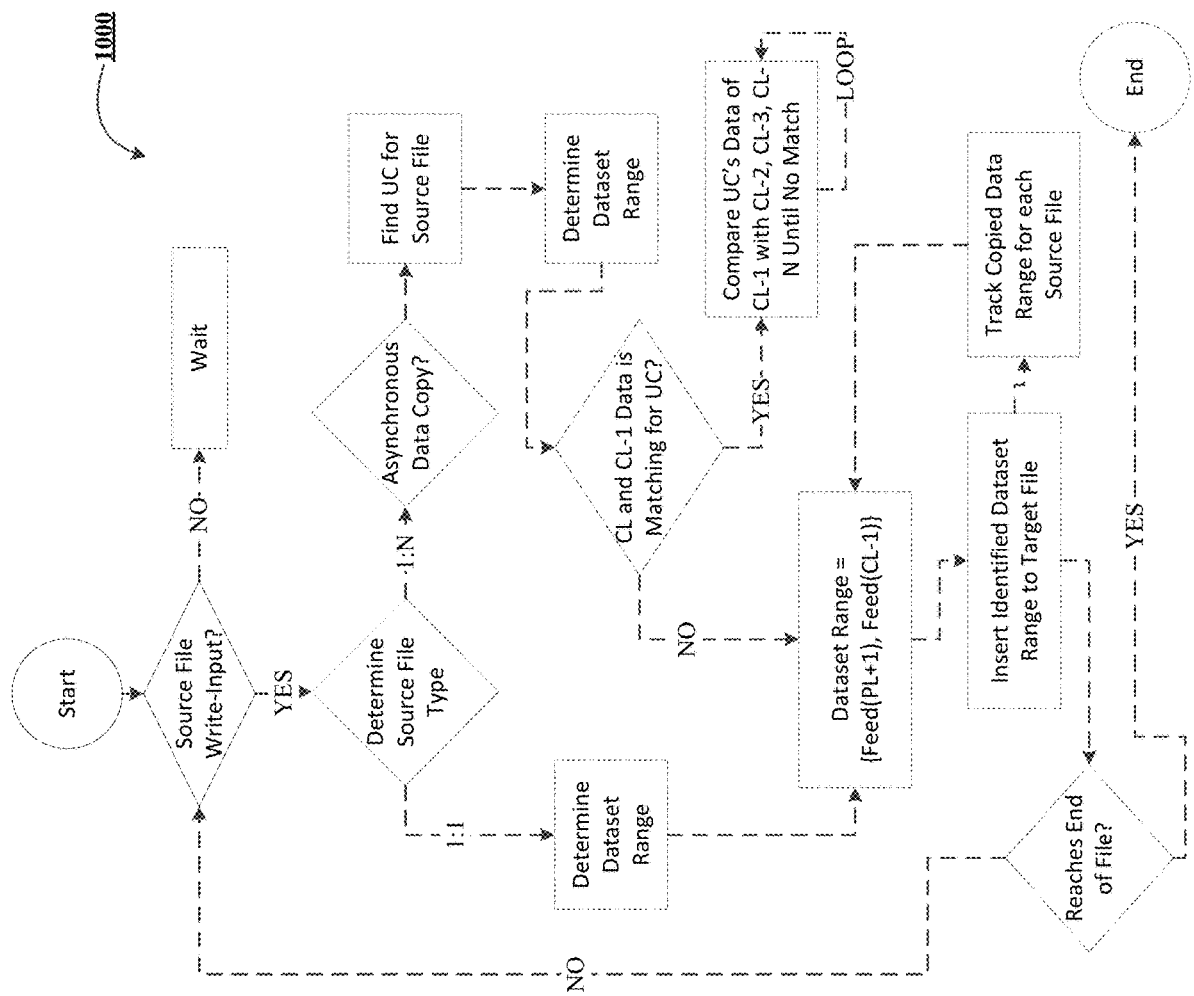

Having thus described embodiments of the invention in general terms, reference will now be made the accompanying drawings, wherein:

FIGS. 1A-1C illustrates technical components of an exemplary distributed computing environment for generating an interactive 3D environment using spatial computing to generate historical digital components, in accordance with an embodiment of the disclosure;

FIG. 2 illustrates an exemplary Artificial Intelligence (AI) engine, in accordance with an embodiment of the disclosure;

FIG. 3 illustrates a process flow for asynchronous data migration, in accordance with an embodiment of the disclosure;

FIG. 4 illustrates a process flow for identifying and managing a security protocol is present in the source file data, in accordance with an embodiment of the disclosure;

FIG. 5 illustrates a process flow for determining a processing plan for the source data file, in accordance with an embodiment of the disclosure;

FIG. 6 illustrates a process flow for allowing or disallowing the dependency data associated with the unique identifier in real time based on a reasonableness check, in accordance with an embodiment of the disclosure;

FIG. 7A-7B illustrates exemplary diagrams showing one-to-one type and one-to-many type datasets along with current/latest line identifiers, in accordance with an embodiment of the disclosure;

FIGS. 8A-8C illustrates exemplary diagrams showing a one-to-multiple type dataset, with total dependency data for each cluster and reasonableness check data, in accordance with an embodiment of the disclosure;

FIGS. 9A-9C illustrates exemplary diagrams showing a one-to-multiple type dataset with clusters for each unique identifier, with total dependency data for each cluster and reasonableness check data, in accordance with an embodiment of the disclosure; and FIG. 10 illustrates an exemplary flow diagram for asynchronous data migration, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Issues often arise between systems and their datasets when data is supposed to be transferred, copied, and/or migrated to a downstream system or database. This is especially true when data in the system is still being actively written and read before it can be migrated downstream. Such migration can take a lot of time, can lead to a lot of errors (especially when data is being migrated as a whole set and data may go missing during the migration), and can be completely lost if the system goes down and its data is lost. Thus, there exists a need for a system, method, or computer program product that can efficient, accurately, and dynamically migrate data from a source file to a target file in an asynchronous fashion.

The disclosure herein provides a framework for decreasing the processing and integration time needed for migrating data from source files to a target file, such as an intelligent framework which comprises AI (e.g., AI Markup Language) to take the source file data and analyze it in chunks (after determining the type of file the source file is, what kind of data is stored in the file, and what kind of security protocols there may be in the data). Once the data has been analyzed in these chunks, the intelligent framework, the data may be aggregated based on analyzing whether a unique identifier is used for various associated data, and ingested to a target file as one aggregated piece/chunk. In some embodiments, the intelligent framework may process in parallel any security protocols and search for the associated secure data (e.g., cryptographic keys, and/or the like) that may be necessary for copying the data from the source file to the target file and/or an application fully. Thus, the disclosure provides an intelligent framework to analyze source files in chunks to migrate the source data to a target file and/or target application in real-time and in an asynchronous manner, such that the time it takes to migrate all the data from a source file is substantially improved, processing speeds are improved during the migration, and computing resources are saved by allowing the migration to occur in chunks rather than as large files.

Accordingly, the present disclosure provides for identifying an source file data based on an update trigger (e.g., such as receiving a write trigger for the source file data) for the source file data; and identifying, using an artificial intelligence (AI) engine, a source file type (e.g., an identification of the source data as comprising a one-to-one type of data or a one-to-many type of data, such that data for a unique identifier will be kept as is for migration or aggregated for migration) for the source file data. Additionally, the present disclosure provides for determining, using a dataset finder, a dataset range for the source file data to ingest to a target data file, wherein the dataset range comprises a portion of data of the source file data; and ingest the dataset range to the target data file (e.g., in chunks and asynchronously).

What is more, the present invention provides a technical solution to a technical problem. As described herein, the technical problem includes the data migration from a source file to a target file. The technical solution presented herein allows for a unique process for data migration and ingestion to target file(s), parallel optimized data ingestion to all downstream files/target files with accuracy and efficiency, chunking data such that processing speeds are improved and data storage is accurately predetermined for these smaller sets, eliminating file level dependencies, improving data migration time, and/or the like. Further, and in some embodiments, the technical solution further provides—in some instances—an identification of potential threats in real time for dependency data (e.g., transaction amounts) and real time threat calculations based on these transactions and amounts. In particular, the disclosure provided herein is an improvement over existing solutions to the data migration, (i) with fewer steps to achieve the solution, thus reducing the amount of computing resources, such as processing resources, storage resources, network resources, and/or the like, that are being used; (ii) providing a more accurate solution to problem, thus reducing the number of resources required to remedy any errors made due to a less accurate solution (e.g., by chunking the data such that smaller portions are migrated in real time rather than as large sets); (iii) removing manual input and waste from the implementation of the solution, thus improving speed and efficiency of the process and conserving computing resources (e.g., by automatically and dynamically migrating data in small portions and eliminating the potential problem where a source file or source system may go down or be interrupted); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing AI to generate a time-sensitive notifications related to configuration of GUIs 100, in accordance with an embodiment of the invention. As shown in FIG. 1A, the distributed computing environment 100 contemplated herein may include a system 130 (i.e., a system described herein), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include a mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large datasets is a large number of variables that require a lot of computing resources to process. Feature extraction and/or selection may be used to select and/or combine variables into features, effectively reducing the amount of data that must be processed, while still accurately and completely describing the original dataset. Depending on the type of artificial intelligence algorithm being used, this training data 218 may require further enrichment. For example, in supervised learning, the training data is enriched using one or more meaningful and informative labels to provide context so an artificial intelligence engine can learn from it. Data labeling is required for a variety of use cases including computer vision, natural language processing, and speech recognition. In contrast, unsupervised learning uses unlabeled data to find patterns in the data, such as inferences or clustering of data points.

In some embodiments, an AI Markup Language (AIML) may be used to train and create rules/patterns for the AI engine, which may then be used for the AI engine to respond to queries, provide information such as based on the queries received, and/or the like. Such AIML may be used by the AI engine to help forecast demand and future queries, optimize database tables (such as the split database tables described herein), improve efficiency in calling up data from database(s), and/or the like.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., $C\_1$, $C\_2$ . . . $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., $C\_1$, $C\_2$ . . . $C\_n$ 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for asynchronous data migration, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, an artificial intelligence engine (e.g., such as the AI engine shown in FIG. 2) may perform some or all the steps described in process flow 300.

As shown in block 302, the process flow 300 may include the step of identifying a source file data based on an update trigger for the source file data. For example, the system may identify a source file by identifying the presence of a file within a database, within a computing system, within an application, within an index, and/or the like. Such an identification of the source file may be initiated by receiving and/or identifying an update trigger associated with the source file, whereby the update trigger may comprise an indication that the file is receiving an update in form of an update to the code (or line of code), an update to an output of one of the code lines, a writing to the output of a line of code, any such change to the source file, and/or the like. As used herein, any update to the code (or line of code), update to an output of the one of the code lines, a writing to the output of a line of code, and/or the like, may be referred to as a write-input to the source file source file data. Additionally, and based on identifying the update trigger with respect to a write-input, the system may collect a real-time identification of the write-input to the source file source file data, such that the data of the write-input is collected (e.g., the changes made are recorded, the timestamp of the changes made are recorded, and/or the like). Further, and based on this real-time identification, the system may identify the write-input in real-time and complete the processes described herein in real-time or near real-time.

In some embodiments, the update trigger may be based on a time threshold being met, such that the system will periodically (e.g., based on the time threshold) analyze each source file regularly and continually. In some such embodiments, the update trigger based on a writing to the source file/update to the source file may act as a restart to the time for the time threshold, such that the most-recent update trigger itself is used to determine the time for the time threshold. Similar to the description provided above, and based on this time threshold being met, the system may collect all the data of the source file source file data in real-time and may complete the processes described herein in real-time or near real-time.

As used herein, the source file refers to any file that is upstream (i.e., an upstream source file) or effects a downstream file, application, system, computing component (software and/or hardware), database, index, and/or the like. Thus, the upstream source file data is the data of this source file and the source file data may be organized in any manner that is understood in the art (e.g., an index, a table, a spreadsheet, a folder, centralized, structured, partitioned, and/or the like). Additionally, such an source file may be stored in any format known in the art (e.g., a database, an index, a folder, a centralized data storage compartment, a partitioned data storage compartment(s), and/or the like), such that the source file(s) is easily tracked, pulled, and interacted with.

In some embodiments, and by way of example which may be used herein, the source file data may comprise data regarding an entity's records, such as where an entity is a financial institution and the data comprises information of a user account, a resource account, a resource transaction (or plurality of resource transactions), a date, a time, a sender account identifier, a recipient account identifier, and/or the like.

As shown in block 304, the process flow 300 may include the step of identifying-using an AI engine-a source file type for the source file data. For instance, the system may identify or determine the source file type to be at least one of a one-to-one file type or a one-to-multiple file type. In some embodiments, additionally file types may be used for identifying the type that the source file is. In some embodiments, the system may use an AI engine comprising AIML to identify the source file type for the source file, whereby the AI engine may be pre-trained using markup language identifying each piece of data and their relationships (e.g., such as a one-to-one type and/or a one-to-many type) (e.g., such as by training with user account identifiers, daily data such as dates and times, types of accounts, aggregate month end data, single transaction data, and/or the like).

As used herein, the one-to-one type refers to a dataset comprising a unique value/identifier to another unique attribute, value, and/or the like, where only one option is available for the second portion of the one-to-one type (e.g., the unique attribute, value, and/or the like). For example, and where a dataset comprises a unique identifier such as a user account identifier being linked with an account type, and where the unique identifier can only be linked to one account type (e.g., Account Type A, Account Type B, Account Type C, and/or the like, a mortgage account, a savings account, a current account, and/or the like), then the system may identify the source file type as one-to-one. An example of a one-to-one type source file is shown and described below with respect to FIG. 7A.

With respect to one-to-many source file type, this file type refers to a dataset comprising a unique value/identifier which may be associated with many attributes, values, and/or the like). For example, and where a dataset comprising a unique identifier such as a user account identifier being linked with a data for a transaction, a plurality of transactions may occur for a user account on the same date so multiple attributes may be stored and associated with a single user account identifier. Examples of a one-to-multiple type are shown and described below with respect to FIGS. 7B, 8A-8C, and 9A-9C.

In some embodiments, and based on the source file type (e.g., where the source file type is one-to-many), the system may determine a dataset range that should be copied or transferred to a target file, whereby the process may be different based on the type of source file the source file data belongs to. For example, and where the source file type is one-to-one for the source file data, then the system may automatically determine the data range set based on the data that has not already been transferred to the target file and based on data which was previously read and copied to the target file (i.e., the "previously copied line" or "PL" as shown in FIG. 9A) by reading the data forward from the PL and the current line being written (i.e., the "current line" or "latest line written," or "CL") and reading backward from the CL. For example, such a process may be shown below:

Step 1: Verify if file is being written else wait for threshold time to be met
Step 2: PL=Previously Copied Line (For first Time, PL=0 line or top line),
CL=Current Line/Latest Line written, UC=Unique identifiers/values
Feed Type 1:1 or 1:N (multiple type)
If type 1:1
   Date Set Range={Feed(PL+1), Feed (CL−1)}
   Read and Ingest Data Set Range
   Loop until End of Source File/Source File Data As shown in block 306, the process flow 300 may include the step of determining a dataset range for the source file data to ingest to a target data file, wherein the dataset range comprises a portion of data of the source file data.

In some embodiments, the dataset range may be determined by a dataset finder, which is configured to determine analyze the source file data line by line to determine the dataset range. Such a dataset finder may refer to an algorithm (such as the algorithm shown and described above with respect to a 1:1 feed type, or the algorithm shown below with respect to a 1:N feed type), which determines the dataset range that will be ingested to a target file(s), whereby each of the dataset ranges are used to chunk the data such that the data is ingested/input to the target file in smaller chunks than the source file data all at once. Additionally, and as used herein, the terms "data set" and "dataset" may be used interchangeably and synonymously.

In contrast to a 1:1 feed type dataset finder algorithm, the 1:N (one-to-multiple) feed type may use the following dataset finder algorithm to determine the dataset range:

Step 1: Verify if file is being written else wait for threshold time to be met
Step 2: PL=Previously Copied Line (For first Time, PL=0 line or top line),
CL=Current Line/Latest Line written, UC=Unique identifiers/values
Feed Type 1:1 or 1:N (multiple type)
If type 1:N
   Find UC for the source file
   Compare data of CL and CL−1
     if not matching
       Data Set Range={Feed(PL+1), Feed(CL−1)}
     if matching
       Loop Compare UC's data of CL−1 with CL−2, CL−3, . . . CL−N until no match
     If not able to generate Data Set Range in Threshold Time,
       Stop
     Otherwise,
       Loop until End of Source File/Source File Data Thus, and as shown above with respect to the dataset finder, the dataset range may comprise a backward copy of the source file data based on a latest line written (PL) and a forward copy based on a current line or latest line written (CL, CL−1, and/or the like). In other words, the dataset range may comprise a backward copy of the source file data based on the latest line copy of the source file data, and a forward copy of the source file data based on a previously copied line. In other words, and in some embodiments, the dataset range may be based on a one-to-multiple type, and the dataset range comprises the backward copy of the source file comprising a same unique identifier for the one-to-multiple type.

In some embodiments, the dataset range may comprise each of newly written lines (e.g., from the previously lined copied, PL) until the current/latest line written, and will be looped until the end of the source file data has been completely copied/transferred to the target file. In this manner, the process described hereinabove with respect to copying ingesting the source file data to the target file will loop until all the chunks of the source data file is copied/ingested to the target file.

In some embodiments, the loop may continue at predefined intervals (e.g., a time threshold) to make sure no new lines have been written to the source file data since the loop ended for the source file/source file data. In this way, the system will be able to accurately and efficiently track each of the versions of the source file and its data even when a write-input has failed to be identified.

As shown in block 308, the process flow 300 may include the step of ingesting the dataset range to the target data file. For example, the system may ingest, upload, input, copy, and/or the like of the dataset range (e.g., the chunk(s) defined by the dataset range) to a target file. In some embodiments, the target file may be predefined by a manager of the system, by the system itself (e.g., based on a trained AI engine which can determine the appropriate target file to ingest the source file data), and/or the like.

In some embodiments, and based on the chunking of the dataset range, the source file data is aggregated (such as the output data described below) to generate a dependency data for each unique identifier (UC) of the source file data. Such an example embodiment is described in further detail below with respect to FIGS. 11, 8A-8C, and 9A-9C. Further, and based on the aggregation of the output data to generate the dependency data, a reasonableness check may occur on the data itself to determine if too many transactions (in an instance where data is associated with resource transactions) are happening and/or if a resource transaction threshold has been met. In such instances, a reasonableness check may return an output that the data associated with the transactions should be blocked and flagged for potential misappropriation and/or blocked for potential malfeasance.

FIG. 4 illustrates a process flow 400 for identifying and managing a security protocol is present in the source file data, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, an artificial intelligence engine (e.g., such as the AI engine shown in FIG. 2) may perform some or all the steps described in process flow 400.

In some embodiments, and as shown in block 402, the process flow 400 may include the step of identifying whether a security protocol is present for the source file data. In some embodiments, and for example, the system may identify whether a security protocol is present for the source file data based on whether data that is expected to be present is missing from the source file, whether data has been encrypted in the source file, whether the data is password protected, and/or the like. Based on this identification, the system may identify/determine that at least one security protocol is present for the source file and that the data must be unlocked and/or retrieved from a secure file (e.g., a file encrypted, or password protected).

In some embodiments, and as shown in block 404, the process flow 400 may include the step of identifying—in an instance where at least one security protocol is present—at least one cryptographic key for the at least one security protocol and unlock the at least one security protocol. For example, and in some embodiments, the system may identify and automatically collect the at least one cryptographic key that is associated with and will unlock the at least one security protocol for the source file. In some embodiments, the system may collect all the cryptographic keys needed to unlock the entire source file automatically, such that each of the cryptographic keys can be applied to the source file in real time and/or near real time.

In some embodiments, and where data is missing from the source file, the system may be configured to retrieve the missing data from the component that generated the source file data automatically and efficiently.

In some embodiments, and where the security protocol requires a password to unlock the source file data, then the system may automatically request the appropriate password(s) to unlock the source file, collect the password(s), and apply the password(s). In some such embodiments, the unlocking of the security protocol(s) for the source file may be done in real-time and/or near real-time. In some such embodiments, the collection of the passwords, the missing data, and/or the cryptographic keys may be done in parallel to the processes described with respect to process flow 300, such that the collection and application of the passwords, the missing data, and/or the cryptographic keys is done efficiently and does not hold up the process of process flow 300.

In some embodiments, and as shown in block 406, the process flow 400 may include the step of determining—in an instance where at least one security protocol is not present—the dataset range for the source file data. For example, and in some embodiments, the system may go through the process described herein with respect to process flow 300 when no security protocols are present in the source file.

FIG. 5 illustrates a process flow 500 for determining a processing plan for the source data file, in accordance with an embodiment of the disclosure. In some embodiments, a system (e.g., similar to one or more of the systems described herein with respect to FIGS. 1A-IC) may perform one or more of the steps of process flow 500. For example, a system (e.g., the system 130 described herein with respect to FIG. 1A-1C) may perform the steps of process 500. In some embodiments, an artificial intelligence engine (e.g., such as the AI engine shown in FIG. 2) may perform some or all the steps described in process flow 500.

In some embodiments, and as shown in block 502, the process flow 500 may include the step of determining—using the AI engine—whether a critical dependency for the source file data, whether the source file data comprises priority, and/or whether abnormal data is present for the source file data. For example, and in some embodiments, the system may determine, such as by using an AI engine that has pre-trained with data regarding historical source file data and identifications of historical instances where a critical dependency is present, where a source file is considered a priority (or a dependent file is considered a priority), and/or whether abnormal historical data is present. In this manner, the AI engine may be used to determine any of these instances in the current source file, and where such instance is present (or a plurality of these different instances are present), then the AI engine may generate an alert indicating the importance of the source file and indicate that the source file should be analyzed and processed first.

For example, and in some embodiments, a critical dependency may indicate that the source file itself is critical in a certain important process for the overall computing system, a business process for a client, and/or the like. In some embodiments, the critical dependency may indicate the criticality of the dependencies for the source file (e.g., those dependent files, applications, transactions, and/or the like), based on how important the dependent files, applications, transactions, and/or the like are to the overall computing system, the business processes of the client, and/or the like. In some embodiments, the priority of the dependency may be based on the priority of the dependent file(s), application(s), transaction(s), and/or the like, which are keeping important processes running without interruption. In some embodiments, the priority of the dependent file(s), application(s), transaction(s), and/or the like, are predetermined by a manager of the system, by a client of the system, by the AI engine itself based on historical priority dependency identifications, and/or the like.

Additionally, and in some embodiments, the system may determine whether the source file comprises any abnormal data, such as unexpected outputs, inputs, and/or the like. In this manner, the system—using the AI engine—may determine that the source file with abnormal data should be processed first in order to determine whether there are any potential issues with the source file itself (e.g., in generating abnormal output data) and/or whether there any potential issues with the input data (e.g., the upstream data) which may indicate a farther reaching problem.

In some embodiments, and as shown in block 504, the process flow 500 may include the step of determining-using the AI engine-a processing plan for the source file data. For example, and in some embodiments, the system may determine a processing plan for each of the source files and their associated data, such that the source files that are determined to be of a greater criticality, priority, have greater amounts of abnormal data, and/or the like. In some embodiments, and where the source file comprises each of the instances highlighted above (e.g., is critical, has priority, and has abnormal data), the source file will be processed first no matter when it was received and/or identified with the update trigger.

FIG. 6 illustrates a process flow 600 for allowing or disallowing the dependency data associated with the unique identifier in real time based on a reasonableness check, in accordance with an embodiment of the disclosure. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 600. In some embodiments, an artificial intelligence engine (e.g., such as the AI engine shown in FIG. 2) may perform some or all the steps described in process flow 600.

In some embodiments, and as shown in block 602, the process flow 600 may include the step of generating—using the AI engine—a reasonableness check on the dependency data, wherein the reasonableness check is based on a reasonableness threshold for the dependency data. For example, and in some embodiments, the system may generate—by a pre-trained AI engine—a reasonableness check based on the dependency data (the output data associated with each unique identifier), whereby the reasonableness check is based on the dependency data (either alone or as a combination/aggregation) being applied to a reasonableness threshold. In some embodiments, the reasonableness threshold may comprise a number of transactions/individual instances within a time period (e.g., the number of transactions tracked within an hour, twelve hours, a day, and/or the like), a value of dependency data (e.g., based on the amount in each transaction for a unique identifier), and/or the like. In this manner, the reasonableness threshold may be used to flag or identify potential misappropriation behavior, malfeasant behavior, abnormal behavior, and/or the like.

By way of non-limiting example and where a unique identifier is a user account identifier associated with an entity, such as a financial institution, and the output data comprises each instance where a resource transaction occurs for the user account (or resource account associated with the user account), the dependency data may comprise the amount for each resource transaction and/or the number of resource transactions within a time period. In some such embodiments, the reasonableness check may return an unreasonable (or outside the reasonableness threshold) flag for those amounts that meet or exceed the reasonableness threshold, which may indicate that the user account has been misappropriated or a malfeasant activity is occurring. In some such embodiments, and when ingesting the dependency data for the unique identifier to a target file (such as a file comprising the allowed resource transactions), the system may block or disallow the resource transaction(s) from occurring and may block the ingestion of the unique identifier and dependency data outside the reasonableness threshold to the target file.

In some embodiments, and as shown in block 604, the process flow 600 may include the step of allowing or disallowing the dependency data associated with the unique identifier in real time based on the reasonableness check. Further, and upon determining that the dependency data meets and/or exceeds the reasonableness threshold, the system may automatically and efficiently block, in real time or near real time, the dependency data from occurring altogether (e.g., blocking the transaction from occurring).

FIGS. 7A-7B illustrates exemplary diagrams showing one-to-one type and one-to-many type datasets along with current/latest line identifiers, in accordance with an embodiment of the disclosure. In some embodiments, a system (e.g., similar to one or more of the systems described herein with respect to FIGS. 1A-1C) may perform one or more of the steps for generating exemplary diagrams 700 and 750. For example, a system (e.g., the system 130 described herein with respect to FIG. 1A-1C) may perform the steps for generating exemplary diagrams 700 and 750. In some embodiments, an artificial intelligence engine (e.g., such as the AI engine shown in FIG. 2) may perform some or all the steps for generating exemplary diagrams 700 and 750.

As shown in exemplary diagram 700, a source file and its data are shown in a table format with a one-to-one type. For example, such a one-to-one type may comprise—as shown here by example—a unique identifier and/or unique value (e.g., the account identifier, which is further associated with an account holder/name) associated with an account type, whereby each account identifier may only be associated with one account type (e.g., account type A, account type B, account type C). Additionally, and as shown in exemplary diagram 700, the last written line (associated with account identifier 1000015 with account type B), may be associated with an attribute or flag such as CL, and the previous line to the last written line CL–1, which may be used in generating the dataset range described above.

Additionally, and as shown in exemplary diagram 750, a one-to-multiple source file and its data are shown in a table form. Here, a unique identifier is associated with a date and time identifier, where each unique identifier could—in theory and in practicality—be associated with multiple dates and times for the same account identifier and multiple dependency data (e.g., transaction amounts). Additionally, and as shown in exemplary diagram 750, the last written line (associated with account identifier 1000014), may be associated with an attribute or flag such as CL, and the previous line to the last written line CL–1, which may be used in generating the dataset range described above.

FIGS. 8A-8C illustrates exemplary diagrams showing a one-to-multiple type dataset, with total dependency data for each cluster and reasonableness check data, in accordance with an embodiment of the disclosure. In some embodiments, a system (e.g., similar to one or more of the systems described herein with respect to FIGS. 1A-1C) may perform one or more of the steps for generating exemplary diagrams 800, 850, and 875. For example, a system (e.g., the system 130 described herein with respect to FIG. 1A-1C) may perform the steps for generating exemplary diagrams 800, 850, and 875. In some embodiments, an artificial intelligence engine (e.g., such as the AI engine shown in FIG. 2) may perform some or all the steps for generating exemplary diagrams 800, 850, and 875.

As shown in exemplary diagram 800, the source file and its data may be organized in a table and identified as having a one-to-multiple type (e.g., a unique identifier is associated with a date and time and dependency data, which can be associated with multiple of each of the date and time and dependency data). Additionally, and as shown by an indicator of "CL" the last line written (associated with account identifier 1000014) may still be in progress, and thus, the baseline for the last line to be copied for the dataset range (CL–1) will be associated with the previous line of data (e.g., which is associated with account identifier 1000012).

As shown in exemplary diagram 850, the source file and its data are depicted as an aggregate based on the unique identifier, the date, and the aggregated dependency data from each date. In this manner, the system may aggregate the data for each unique identifier and its date of a transaction (e.g., based on the example provided throughout), before ingesting or inputting to a target file. Similarly, and as shown in exemplary diagram 875, based on the dependency data for each date and each unique identifier, a reasonableness check for each date and dependency data may occur (which here indicates that the total dependency data for the date and unique identifier 1000012 exceeds the reasonableness threshold).

FIGS. 9A-9C illustrates exemplary diagrams showing a one-to-multiple type dataset with clusters for each unique identifier, with total dependency data for each cluster and reasonableness check data, in accordance with an embodiment of the disclosure. In some embodiments, a system (e.g., similar to one or more of the systems described herein with respect to FIGS. 1A-1C) may perform one or more of the steps for generating exemplary diagrams 900, 950, and 975. For example, a system (e.g., the system 130 described herein with respect to FIG. 1A-1C) may perform the steps for generating exemplary diagrams 900, 950, and 975. In some embodiments, an artificial intelligence engine (e.g., such as the AI engine shown in FIG. 2) may perform some or all the steps for generating exemplary diagrams 900, 950, and 975.

As shown in exemplary diagram 900, a source file organized in a table shows a one-to-multiple type for the data, whereby each unique identifier is associated with a date and dependency data for each transaction (e.g., an amount for each transaction), where the highlighted portion shows where the last/previously copied line ends (e.g., by "PL" for unique identifier 1000012) for the last ingestion to the target file and where the current/last line written is (e.g., by "CL"

for unique identifier 1000015). Thus, and based on the dataset finder described above with respect to FIG. 3, the dataset range may be determined to comprise the unique identifiers, dates, and dependency data for unique identifiers 1000006 to 1000014. Additionally, and as shown by of example in diagram 900, the system may only ingest the data to a target file once the unique identifier and its data has all been written (e.g., unique identifier 1000015 has not had all its data written yet).

As shown in diagram 950, the data being ingested to the target file may be aggregated based on the date for its transactions and the individual dependency data for each transaction, such that overall dependency data is copied over instead of each individual transaction amount. Additionally, and as shown in diagram 975, a reasonableness check may occur for the data before it is ingested to the target file (e.g., as shown for unique identifier 1000014 where the number of transactions is meets or exceeds the reasonableness threshold).

FIG. 10 illustrates an exemplary flow diagram 1000 for asynchronous data migration, in accordance with an embodiment of the disclosure. In some embodiments, a system (e.g., similar to one or more of the systems described herein with respect to FIGS. 1A-1C) may perform one or more of the steps for generating exemplary flow diagram 1000. For example, a system (e.g., the system 130 described herein with respect to FIG. 1A-1C) may perform the steps for generating exemplary flow diagram 1000. In some embodiments, an artificial intelligence engine (e.g., such as the AI engine shown in FIG. 2) may perform some or all the steps for generating exemplary flow diagram 1000.

As shown in exemplary flow diagram 1000, the processes described throughout this disclosure are shown in a step-by-step flow. As understood by a person of skill in the art, each of the steps shown herein may be used to complete the process described herein, or only a portion of these steps may be used to complete the process. In either instance, the disclosure provided herein will continuously, and in chunks, ingest data from a source file to a target file.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for asynchronous data migration, the system comprising:
    a memory device with computer-readable program code stored thereon;
    at least one processing device operatively coupled to the at least one memory device and the at least one communication device, wherein executing the computer-readable program code is configured to cause the at least one processing device to:
    identify a source file data based on an update trigger for the source file data;
    identify, using an artificial intelligence (AI) engine, a source file type for the source file data, wherein the AI engine identifies the source file type as a one-to one file type or a one-to-multiple file type;
    determine a dataset range for the source file data to ingest to a target data file, wherein the dataset range comprises only a portion of data of the source file data; and
    ingest the dataset range to the target data file,
        wherein executing the computer-readable program code is configured to cause the at least one processing device to:
        identify whether a security protocol is present for the source file data,
            wherein, in an instance where at least one security protocol is present, identify at least one cryptographic key for the at least one security protocol, or
            wherein, in an instance where at least one security protocol is not present, determine the dataset range for the source file data,
        wherein an output of the source file data is aggregated to generate a dependency data for each unique identifier of the source file data,
        wherein executing the computer-readable program code is further configured to cause the at least one processing device to generate, using the AI engine, a reasonableness check on the dependency data, wherein the reasonableness check is based on a reasonableness threshold for the dependency data; and
        allow or disallow the dependency data associated with the unique identifier in real time based on the reasonableness check.

2. The system of claim 1, wherein the update trigger is based on a file write input to the source file data.

3. The system of claim 1, wherein the update trigger comprises at least one of a real-time identification of a write input to the source file data or a real-time meeting of a wait threshold time.

4. The system of claim 1, wherein the source file type comprises the one-to-one type for the source file data or the one-to-multiple type for the source file data.

5. The system of claim 1, wherein executing the computer-readable program code is configured to cause the at least one processing device to:
    determine, using the AI engine, whether a critical dependency for the source file data is present, whether the source file data comprises priority, or whether abnormal data is present for the source file data; and
    determine, using the AI engine, a processing plan for the source file data.

6. The system of claim 1, wherein the dataset range comprises a backward copy of the source file data based on a latest line copy of the source file data, and a forward copy of the source file data based on a previously copied line.

7. The system of claim 6, wherein the dataset range is looped until an end of the source file data.

8. The system of claim 6, wherein the dataset range is based on the one-to-multiple type, and wherein the dataset range comprises the backward copy of the source file comprising a same unique identifier for the one-to-multiple type.

9. A computer program product for asynchronous data migration, wherein the computer program product comprises at least one non-transitory computer-readable medium having computer-readable program code portions embodied therein, the computer-readable program code portions which when executed by a processing device are configured to cause the processor to perform the following operations:
    identify a source file data based on an update trigger for the source file data;
    identify, using an artificial intelligence (AI) engine, a source file type for the source file data, wherein AI engine identifies the source file type as a one-to-one file type or a one-to-multiple file type;
    determine a dataset range for the source file data to ingest to a target data file, wherein the dataset range comprises only a portion of data of the source file data; and
    ingest the dataset range to the target data file,
        wherein the computer-readable program code is configured to cause the processor to perform the following operations:
        identify whether a security protocol is present for the source file data,
            wherein, in an instance where at least one security protocol is present, identify at least one cryptographic key for the at least one security protocol, or
            wherein, in an instance where at least one security protocol is not present, determine the dataset range for the source file data,
        wherein an output of the source file data is aggregated to generate a dependency data for each unique identifier of the source file data,
        wherein the computer-readable program code is further configured to cause the processing device to generate, using the AI engine, a reasonableness check on the dependency data, wherein the reasonableness check is based on a reasonableness threshold for the dependency data; and
        allow or disallow the dependency data associated with the unique identifier in real time based on the reasonableness check.

10. The computer program product of claim 9, wherein the update trigger comprises at least one of a real-time identification of a write input to the source file data or a real-time meeting of a wait threshold time.

11. The computer program product of claim 9, wherein the computer-readable program code is configured to cause the processor to perform the following operations:

determine, using the AI engine, whether a critical dependency for the source file data is present, whether the source file data comprises priority, or whether abnormal data is present for the source file data; and determine, using the AI engine, a processing plan for the source file data.

12. A computer implemented method for asynchronous data migration, the computer implemented method comprising:

identifying a source file data based on an update trigger for the source file data;

identifying, using an artificial intelligence (AI) engine, a source file type for the source file data, wherein the AI engine identifies the source file type as a one-to-one file type or a one-to-multiple file type;

determining a dataset range for the source file data to ingest to a target data file, wherein the dataset range comprises only a portion of data of the source file data; and ingesting the dataset range to the target data file, the computer implemented method further comprising:

identifying whether a security protocol is present for the source file data, wherein, in an instance where at least one security protocol is present, identifying at least one cryptographic key for the at least one security protocol, or wherein, in an instance where at least one security protocol is not present, determining the dataset range for the source file data, wherein an output of the source file data is aggregated to generate a dependency data for each unique identifier of the source file data, wherein the computer implemented method further comprises generating, using the AI engine, a reasonableness check on the dependency data, wherein the reasonableness check is based on a reasonableness threshold for the dependency data; and allowing or disallowing the dependency data associated with the unique identifier in real time based on the reasonableness check.

13. The computer implemented method of claim 12, wherein the update trigger comprises at least one of a real-time identification of a write input to the source file data or a real-time meeting of a wait threshold time.

14. The computer implemented method of claim 12, further comprising:

determining, using the AI engine, whether a critical dependency for the source file data is present, whether the source file data comprises priority, or whether abnormal data is present for the source file data; and determining, using the AI engine, a processing plan for the source file data.

* * * * *